US005510405A

United States Patent [19]

Heucher et al.

[11] Patent Number: 5,510,405

[45] Date of Patent: Apr. 23, 1996

[54] PLUG-TYPE CONNECTOR FOR COAXIAL CABLES

[75] Inventors: Reimar Heucher, Pulheim; Juergen Wichelhaus, Wuppertal; Kurt Schueller; Bettina Becker, both of Monheim, all of Germany

[73] Assignee: Henkel Kommanditgesellschaft auf Aktien, Duesseldorf, Germany

[21] Appl. No.: 142,452

[22] PCT Filed: May 19, 1992

[86] PCT No.: PCT/EP92/01096

§ 371 Date: Jan. 27, 1994

§ 102(e) Date: Jan. 27, 1994

[87] PCT Pub. No.: WO92/22104

PCT Pub. Date: Dec. 10, 1992

[30] Foreign Application Priority Data

May 28, 1991 [DE] Germany .......................... 41 17 395.3

[51] Int. Cl.[6] .............................. C08K 5/20; C08F 8/30; H01R 13/52

[52] U.S. Cl. .......................... 524/233; 524/514; 525/183; 525/184; 439/271

[58] Field of Search .................................... 525/183, 184; 524/514, 233; 439/271

[56] References Cited

U.S. PATENT DOCUMENTS

| | | | |
|---|---|---|---|
| 4,791,164 | 12/1988 | Wichelhaus et al. | 524/514 |
| 5,006,286 | 4/1991 | Dery et al. | 264/40.2 |

FOREIGN PATENT DOCUMENTS

| | | |
|---|---|---|
| 3342834 | 1/1985 | Germany . |
| 3504804 | 8/1986 | Germany . |

OTHER PUBLICATIONS

Technical Information Pamphlet "Macromelt® Hotmelt" published Mar. 1990 Adhäsion (1969) Heft 1.

*Primary Examiner*—Paul R. Michl
*Assistant Examiner*—LaVonda R. DeWitt
*Attorney, Agent, or Firm*—Ernest G. Szoke; Wayne C. Jaeschke; Kenneth Watov

[57] ABSTRACT

A plug-type connector for electrical coaxial cables includes a hot-melt-type adhesive for filling in the interior space between an outer bushing and centrally located contact bushing, with the contact bushing being configured for receiving an inner conductor of a coaxial cable. The hot-melt-type adhesive seals, fills, and insulates the interior portions of the plug-type connector surrounding the centrally located contact bushing and inner conductor of the associated coaxial cable. The hot-melt-type adhesive consists a polyamide based on dimerized fatty acids, aliphatic amines, and modifiers, and a copolyethylene and additives.

20 Claims, 1 Drawing Sheet

PLUG-TYPE CONNECTOR FOR COAXIAL CABLES

BACKGROUND

1. Field of the Invention

This invention relates generally to electrically connectors, and more particularly to a plug connection for electrically conductive cables and to its production.

2. Discussion of Related Art

Plug connections of the type in question are known. For example, a waterproof plug connection containing Macromelt® hotmelt adhesives is described in Henkel KGaA's technical information pamphlet "Macromelt® Hotmelt" published in Mar., 1990. This connection meets the stringent requirements of the automotive industry. In contrast to air-conditioned atmospheres, extreme conditions for electronic components prevail in motor vehicles and particularly in engine compartments. Heat, frost, dust, oil and, in particular, spray are the factors which affect electronic components and their connecting elements. If autoelectronics are to operate efficiently, optimal protection is essential. The problem presented by the penetration of moisture into plug connections and cable harnesses was solved by the use of Macromelt®. Macromelt® not only forms a 100% seal against moisture, it also has a high heat resistance of more than 90° to >150° C. (depending on the type of material), excellent low temperature compatibility of more than −30° C. and very good adhesion to various connector housings. The pamphlet also describes the production of a waterproof connector from the hotmelt adhesive Macromelt®, a cable with contact pins and a pin bushing by means of a hotmelt applicator and a volume met®ring head with exact volume dosing by pouring in the hotmelt adhesive. The hotmelts mentioned have a viscosity of 2,500 to 3,200 mPa.s at 210° C.

SUMMARY OF THE INVENTION

The invention seeks to provide plug connections for electrically conductive cables which are easy to make, but which nevertheless function reliably in adverse conditions, such as dust, moisture, vibration and wide temperature variations in use and exposure to high temperatures during further processing. In one embodiment of the invention, the plug connection contains a hotmelt adhesive having a viscosity of more than 8,000 mPa.s at 200° C. The viscosity of the hotmelt is preferably in the range from 12,000 to 60,000 mPa.s at 200° C., as measured with a Brookfield Thermocel viscosimeter of the RVT type, spindle 27. The best results are obtained with a viscosity of 20,000 to 35,000 mPa.s. With increasing melt viscosity, above 80,000, the void is no longer reproducibly filled and pressure tightness cannot be guaranteed.

In the context of the invention, a cable is understood to be a well-insulated electrical line provided with protective sheaths. Plug connections, i.e. connectors and pin bushings or couplings, are used to extend cables and to connect them to electrical devices. The connector is that part of the plug connection which is provided with contact pins while the pin bushing or coupling is that part which is provided with contact bushings. The connection is established by pushing the contact pin into the contact bushing.

The invention is particularly suitable for the production of plug connections for coaxial cables, more particularly for wide band cable joint boxes. Coaxial cables consist of an inner conductor, for example of copper or aluminium, which is held exactly centrally in the outer conductor, for example of copper, aluminium, brass, etc., by disks, walls or an insulating material with a low dielectric loss factor, for example polystyrene or ceramic. The diameter ratio of the inner conductor to the outer conductor critically determines the characteristic impedance, an important parameter of coaxial cables. The conditions inside the cable, particularly the central arrangement, should remain intact, even during the connection of the cable. The use of a hotmelt adhesive in accordance with the invention is particularly suitable for this purpose, the hotmelt completely filling the space between the inner conductor and the outer conductor and between the outer bushing and the contact pins or contact bushings. If desired, the characteristic impedance can be influenced as required by shaping or by providing voids in the hotmelt adhesive.

BRIEF DESCRIPTION OF THE DRAWINGS

An exemplified embodiment of the invention is described below in greater detail with reference to FIG. 1, which shows a cross sectional view of the inventive embodiment.

DETAILED DESCRIPTION OF THE INVENTION

Figure 1:
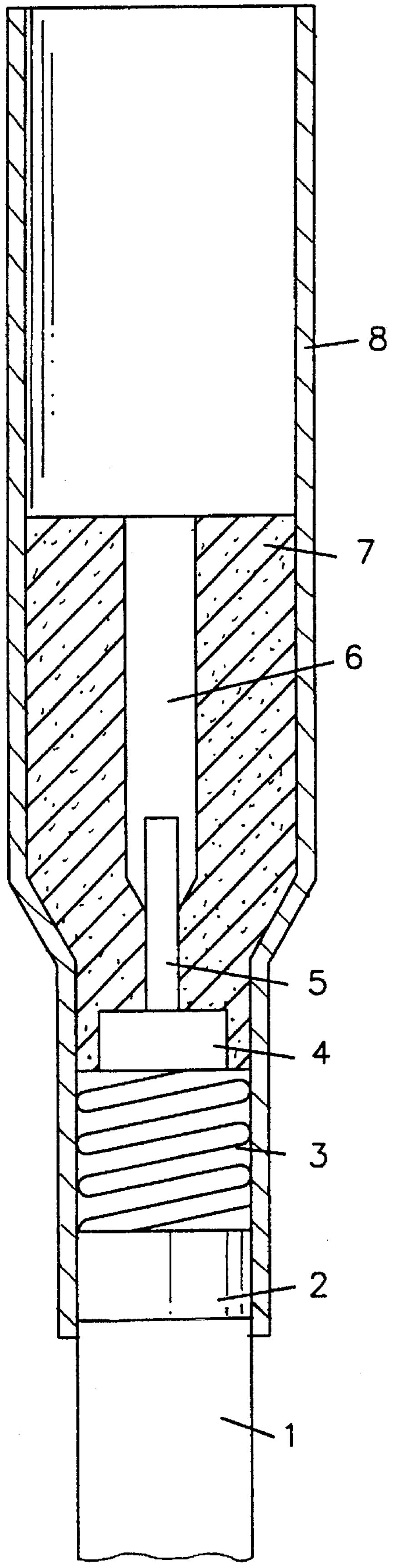

A preferred embodiment of the invention is illustrated in FIG. 1. The cable (1) consists of a sleeving (2), an outer conductor (3), an insulator (4) and an inner conductor (5). For connection with a connector, the pin bushing or coupling according to the invention contains a contact bushing (6) which is insulated from the outer bushing (8) and kept centered by the hotmelt (7).

The hotmelt adhesive for the plug connection according to one embodiment of the invention not only performs the typical function of a hotmelt adhesive, namely joining two parts firmly to one another after cooling from the melt. In the present case, it also performs the functions of sealing, filling and insulating. Thus, in the present case, not only is the cable (1) held firmly together with the plug connection, the penetration of, in particular, moisture and dust between the cable (1) and the outer bushing (8), and between the contact bushing (6) and the insulating hotmelt (7), is also prevented. The space between the contact bushing (6) or the contact pin and the outer bushing (8) is to be filled in a dimensionally stable but flexible manner. When choosing the hotmelt adhesive, it is important to consider that it is supposed to act as an insulator. Accordingly, the contributions made by the individual components of the mixture to the relative dielectric constant and to the dielectric losses must be taken into consideration so that, overall, the required values are obtained. For use as a wide band cable joint box, the attenuation should be at least 25 dB.

A suitable hotmelt adhesive is the adhesive described in DE-A-35 04 804. Accordingly, it is preferred to use a hotmelt adhesive of a mixture of A) 5 to 95% by weight polyamide based on dimerized fatty acids, aliphatic amines and modifying additives thereof and B) 95 to 5% by weight copolymers of ethylene, and at least one of the following copolymers: inner anhydride of an ethylenically unsaturated dicarboxylic acid, propylene, (meth)acrylates and/or vinyl esters containing up to 4 carbon atoms in the alcohol component. In addition, the hotmelt adhesive contains 20 to 60% by weight, based on the total weight of the hotmelt adhesive, of other auxiliaries. Of these adhesives, the following are preferably used for the plug connection according to the invention:

A) 10 to 60% by weight acid-terminated PA,

B) 40 to 90% by weight of a copolyethylene containing vinyl acetate, methyl acrylate or butyl acrylate as comonomer.

Components A) and B) together total 100%. In addition, the hotmelt adhesive preferably contains 25 to 55% by weight auxilaries, based on its total weight.

The disclosure of DE-A-35 04 804 is hereby specifically included as part of the disclosure of the present application. This applies in particular to the starting materials and to the production of the hotmelt adhesives.

The plug connections according to the invention may be produced substantially as follows: the inner conductor 5 insulated cable 1 (see for example FIG. 1) is connected to the contact bushing (6) or rather to the contact pin (for example by soldering or pinching) and pushed into the outer bushing (8). The two components are placed on a counterpart, i.e. a connector mold, if a bushing is to be produced. The void formed is completely or partly filled as required with the molten adhesive. It may be injected into the mold, for example through an annular die or an injection nozzle (injection molding). It is advantageous if the nozzle is positioned as far as possible inside the outer bushing 8 and pushed outwards with increasing filling.

The plug connection according to the invention even satisfies the stringent requirements of the wide-band cable industry. More particularly, it is possible to draw a shrink tube or shrink article over the plug connection and the cable and to allow it to shrink horizontally by heating to more than 150° C. The plug connections are capable of withstanding an excess pressure of at least 0.3 at. Both during production and in normal use, the pin bushings and contact pins 6 are situated in exactly the required position without any need for additional fixing means, even in large plug connections. However, if so little hotmelt 7 is used that the pin bushing or rather the contact pins 6 project to a considerable extent, an additional fixing disk where they begin can be useful. Despite the high viscosity, there are no harmful voids.

The invention is illustrated by the following Example.

A Production of a connector

The 15 mm thick coaxial cable 1 has a 1 mm thick sleeving of polyethylene, an outer conductor 3 of copper, a 3.5 mm thick insulator of polyethylene and a 2 mm thick inner conductor 5 of copper. The cable 1 is insulated as shown in FIG. 1. A silver-coated contact bushing 6 is fitted onto the inner conductor 5. An outer bushing of brass is screwed onto the end of the cable. It had a length of 83 mm, a thickness of 0.8 mm and an internal diameter of 20 mm.

The hotmelt adhesive Macromelt®TPX 20-239 (a product of Henkel KGaA, Düsseldorf) is used for casting. Its principal components are: 25% by weight PA, 32% by weight EVA and 43% by weight auxiliaries. It has a melt viscosity of 21,000 mPa.s at 210° C, 26,000 mPa.s at 200° C.; 38,000 mPa.s at 190° C. and 125,000 mPa.s at 160° C. and a heat resistance of 70° C.

To determine heat resistance, two 25.0 mm wide strips of flexible cardboard were bonded with an overlap (length of overlap 25.0 mm) in accordance with Henkel's WPS 68 test (see Adhesion (1969), No. 1). The bond is subjected to a load of 13.5 N (0.02 N/mm$^2$) and exposed to a temperature increase of 5° C./10 mins. in a recirculating air drying cabinet. The heat resistance is the temperature at which the bond still does not break.

The void was filled as follows with the hotmelt adhesive 7 described above:

Equipment: Meltex applicator, type MX 4012, dosing with a type ES 66 timing unit Gear pump rotating at 60 r.p.m. Nozzle diameter: 1.0 mm Temperature:
premelting range 190° C.
main melting range 210° C.
hoses 220° C.
heads 240° C.

Pressure at the applicator head with the return valve closed: 60 bar

Reduction in pressure during filling: 10 to 15 bar

Quantity of polyamide cast: 1.5 g

Preheating of brass bushing to 140–150° C.

B. Properties of the pin bushing

The pin bushing 6 is pressure-tight to at least 0.3 atm-.gauge. Shrinkage up to at least 150° C. is possible during further processing, even in the horizontal position. The attenuation amounts to 35 dB.

It is surprising that adequate pressure tightness was obtained, despite the high melt viscosity, and that the shrink-on parts could be heated to 150° C. and higher in the horizontal position despite the low heat resistance of less than 85° C. (in the present case 70° C).

What is claimed is:

1. A plug connection for electrically conductive cables, comprising an assembly including:

an inner conductor of the insulated cable being connected to a contact bushing or a contact pin;

an outer bushing being pushed over an end of the cable;

a cavity being formed in the space between said contact pin or contact bushing and said outer bushing;

molten hotmelt adhesive having a melt viscosity of at least 8,000 mPa.s at 200° C. being formed in said cavity, wherein said hotmelt adhesive secures said outer bushing, contact pin or contact bushing, inner conductor of said insulated cable, and said insulated cable together, while serving as an electrical insulator therebetween.

2. A plug connection as claimed in claim 1, further including a hotmelt adhesive having a melt viscosity of 12,000 to 60,000 mPa.s at 200° C.

3. A plug connection as claimed in claim 1, wherein said electrically conductive cables consist of coaxial cables.

4. A plug connection as claimed in claim 1, wherein said hotmelt adhesive includes a mixture of a polyamide based on dimerized fatty acid, aliphatic amines and modifying additives selected from the group consisting of aliphatic dicarboxylic acids, amino carboxylic acids, caprolactam, monofunctional amines, fatty acids, carboxylic acid anhydrids, and fatty acid esters, and a copolymer of ethylene, and at least one of the following comonomers: cyclic anhydride of an ethylenically unsaturated dicarboxylic acid, propylene, methacrylates, and/or vinyl esters.

5. A plug connection as claimed in claim 1, wherein voids are provided by not completely filling said cavity with said hotmelt adhesive to adjust the electrical impedance of said plug connection.

6. A plug connection as claimed in claim 1, wherein said plug connection is formed by casting of the hotmelt adhesive.

7. A plug connection as claimed in claim 5, further including an assembly including:

an annular nozzle with a guide for the contact bushing or the contact pin being pushed into the outer bushing for injecting said hotmelt adhesive under pressure into said cavity, whereafter said nozzle is removed and said hotmelt adhesive is cooled.

8. A plug connection as claimed in claim 2, wherein voids are provided by not completely filling said cavity with said hotmelt adhesive to adjust the electrical impedance of said plug connection.

9. A plug connection as claimed in claim 3, wherein voids are provided by not completely filling said cavity with said hotmelt adhesive to adjust the electrical impedance of said plug connection.

10. A plug connection as claimed in claim 4, wherein voids are provided by not completely filling said cavity with said hotmelt adhesive to adjust the electrical impedance of said plug connection.

11. A plug connection as claimed in claim 3, wherein said plug connection is formed by casting of the hotmelt adhesive.

12. A plug connection as claimed in claim 4, wherein said plug connection is formed by casting of the hotmelt adhesive.

13. A plug connection as claimed in claim 5, wherein said plug connection is formed by casting of the hotmelt adhesive.

14. A plug connection for electrically conductive cables comprising a plug and a plug socket, which each include a connected cable, provided with a contact pin and a contact socket, respectively, whereby the plug and/or the plug socket include a space between an external socket and the contact pin and/or the contact sockets, respectively, filled with thermoplastic adhesive having melting viscosity of 12,000 to 60,000 mPa.s at 200° C.

15. A plug connection according to claim 14, whereby said thermoplastic adhesive has a melting viscosity of 20,000 to 35,000 mPa.s at 200° C.

16. A plug connection according to claim 14, wherein said cable is a coaxial cable.

17. A plug connection according to claim 14, wherein said thermoplastic adhesive consists of a mixture of polyamide based on dimerized fatty acid, aliphatic amines and modifying additives (selected from the group consisting of aliphatic dicarboxylic acids, amino carboxylic acids caprolactam, monofunctional amines, fatty acids, carboxylic acid anhydrids, and fatty acid esters), or a mixture of copolymers from ethylene and at least one or a combination of the following co-monomers: internal anhydride of ethylenically unsaturated dicarboxylic acid, propylene methacrylic acid esters and/or vinyl esters.

18. A plug connection according to claim 14, further including defined hollow spaces within said thermoplastic adhesive.

19. A plug connection according to claim 14, wherein thermoplastic adhesive is cast into the space between the external socket and the contact pin and/or the contact socket, respectively.

20. A plug connection according to claim 19, further including:

- an internal wire of the said cable being connected with a contact socket and/or with a contact pin, respectively;
- said external socket being pushed over the end of the cable; and
- a thermoplastic adhesive hot melted or while in a fluid state being injected into said space via a circular nozzle pushed with a pin guide for the contact socket or the contact pin into the external socket, respectively, whereafter the circular nozzle is again removed and the plug connection is cooled, causing the thermoplastic adhesive to solidify.

* * * * *